United States Patent
Fang

(10) Patent No.: US 7,121,637 B2
(45) Date of Patent: Oct. 17, 2006

(54) DETACHABLE AND ROTATABLE DOOR COVER ASSEMBLY

(75) Inventor: Chen-Sheng Fang, Taichung (TW)

(73) Assignee: Quanta Computer, Inc., Taoyuan Hsien (TW)

( * ) Notice: Subject to any disclaimer, the term of this patent is extended or adjusted under 35 U.S.C. 154(b) by 336 days.

(21) Appl. No.: 10/702,515

(22) Filed: Nov. 7, 2003

(65) Prior Publication Data

US 2005/0029908 A1 Feb. 10, 2005

(30) Foreign Application Priority Data

Aug. 6, 2003 (TW) .............................. 92214295 U

(51) Int. Cl.
*A47B 97/00* (2006.01)
(52) U.S. Cl. .................................... 312/223.2; 361/687
(58) Field of Classification Search ............ 312/223.1, 312/223.2, 257.1, 265.5, 265.6, 292, 326, 312/329; 361/679, 683, 687, 724; 16/252, 16/253, 254, 257
See application file for complete search history.

(56) References Cited

U.S. PATENT DOCUMENTS

| | | | | |
|---|---|---|---|---|
| 2,732,581 A | * | 1/1956 | Heck | 220/840 |
| 3,087,192 A | * | 4/1963 | Hertzke | 16/257 |
| 4,846,089 A | * | 7/1989 | Cedergreen | 114/201 R |
| 5,636,101 A | * | 6/1997 | Bonsall et al. | 361/681 |
| 5,649,750 A | * | 7/1997 | Ishii et al. | 312/223.2 |
| 5,694,293 A | * | 12/1997 | Seto et al. | 361/687 |
| 5,732,331 A | * | 3/1998 | Harms | 455/575.3 |
| 5,808,863 A | * | 9/1998 | Radloff et al. | 361/683 |
| 6,000,550 A | * | 12/1999 | Simpson et al. | 206/711 |
| 6,099,097 A | * | 8/2000 | Hocker et al. | 312/327 |
| 6,175,488 B1 | * | 1/2001 | Seto et al. | 361/683 |
| 6,710,240 B1 | * | 3/2004 | Chen et al. | 174/17 VA |
| 2002/0044414 A1 | * | 4/2002 | Chuang | 361/683 |

* cited by examiner

*Primary Examiner*—Peter M. Cuomo
*Assistant Examiner*—Noah Chandler Hawk
(74) *Attorney, Agent, or Firm*—Rabin & Berdo, PC

(57) ABSTRACT

A detachable and rotatable door cover assembly is disclosed for using a door cover to cover a module (such as a thermal module) inside a product (such as a notebook computer). The door cover assembly comprises a rotation base and a clipping groove located on the product; a locking ring located on the modules; and a door cover. One end of the door cover has a rotating member used for connecting pivotally to the rotation base, thereby revolving the door cover. The door cover also has a clipping hook used for engaging with the clipping groove. The door cover further has a ring-fixing base used for locking with the locking ring located on the module.

18 Claims, 4 Drawing Sheets

DETACHABLE AND ROTATABLE DOOR COVER ASSEMBLY

FIELD OF THE INVENTION

The present invention relates to a detachable and rotatable door cover assembly, and more particularly, to a door cover assembly used in a notebook computer for covering a thermal module.

BACKGROUND OF THE INVENTION

With the continuous advent of various electronic components newly developed, and additionally the requirements of maintenance, a notebook computer's user frequently needs to dismantle the top case of the notebook computer's main unit, so as to replace, repair or upgrade various important components, such as a CPU, a thermal module, a VGA card, a keyboard or a touch pad, etc.

For the consideration of structure and EMI (Electromagnetic Interference), the mechanism designs of conventional notebook computers all tightly combine the upper and lower cases of the main units, and also use screws for further fastening, so that the step of dismantling the upper and lower cases of the main unit is quite complicated and difficult. Generally, a common notebook computer can have a relatively good design of replacing a CPU by merely dismantling a keyboard. However, for replacing a thermal module, there is still lacking a design for effectively simplifying the step of replacing the thermal module. Particularly, when the thermal module is over-sized, users usually have to separate the top case of the notebook computer's main unit completely from the notebook computer's main unit, so as to smoothly replace a thermal module. The aforementioned shortcoming not only costs the users a lot of time and effort for maintaining the notebook computers, but also hinders the DIY (Do It Yourself) market from entering the field of notebook computer.

Hence, there is a need to develop a detachable and rotatable door cover assembly, thereby simplifying the steps of replacing a thermal module, thus saving a lot of manpower and material cost, further benefiting the DIY market to enter the field of notebook computer.

SUMMARY OF THE INVENTION

It is an object of the present invention to provide a detachable and rotatable door cover assembly, so that the step of replacing a thermal module can be simplified by using the detachable and rotatable door cover assembly to cover the thermal module located in a notebook computer.

According to the aforementioned object of the present invention, the present invention provides a detachable and rotatable door cover assembly used for covering a module in a product.

According to a preferred embodiment of the present invention, the detachable and rotatable door cover assembly comprises: a rotation base located on the product; a clipping located on the product; and a door cover. The door cover has a rotating member located on one end thereof; and a clipping hook located on the other end thereof, wherein the rotating member is pivotally connected to the rotation base for rotating the door cover, and the clipping hook can be engaged with the clipping groove.

The rotation base at least has: a U-shaped opening facing towards the rotating member; and a pair of shaft holders respectively located on both ends of the U-shaped opening, wherein each of the shaft holders is composed of a pair of shaft blocks which are separated and mutually mirror-reflected in shape. The bottoms of the shaft blocks are connected to a sidewall of the U-shaped opening, and the shaft blocks are higher than the sidewall of the U-shaped opening. There is an arc-surfaced depression area located on the area immediately outside the U-shaped opening.

The rotating member at least has: a rotating main body, wherein one end of the rotating main body is connected to one end of the door cover; and a pair of rotating shafts respectively located on two ends of the rotating member adjacent to the aforementioned one end of the rotating main body, wherein each of the rotating shafts is arranged in the arc-surfaced depression area after passing through the area between the top ends of the shaft blocks.

The rotating member at least has a L-shaped extending portion located under the rotating main body, wherein the open end of the L-shaped extending portion faces outwards from the rotating main body and can be inserted into the area below the rotation base.

Further, the detachable and rotatable door cover assembly further comprises: at least one locking ring installed on the module; and at least one ring holder located on the door cover corresponding to the locking ring, wherein the locking ring can be engaged with the ring holder. The ring holder at least has a ring outlet; a cross-shaped hole formed by intercrossing a first striped hole and a second striped hole, wherein the first striped hole is adjacent to and spaced apart from the ring outlet with a distance; a ring fixing plate located in the first striped hole, wherein one end of the ring fixing plate is connected to the sidewall of one end of the first striped hole adjacent to the ring outlet, the other end of the ring fixing plate having a protrusion; and a pair of L-shaped clipping blocks respectively located on the areas outside both ends of the second striped hole, wherein the open ends of the L-shaped clipping blocks are opposite to each other, and the locking ring can be inserted into and exposed from the ring inlet, and be locked with the L-shaped clipping blocks after being folded towards the protrusion of the ring fixing plate.

Hence, with the application of the present invention, the steps of replacing a thermal module can be greatly simplified, thereby saving a lot of manpower and material cost; and firmly combining the door cover, the thermal module and the notebook computer together by the method of interference fit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
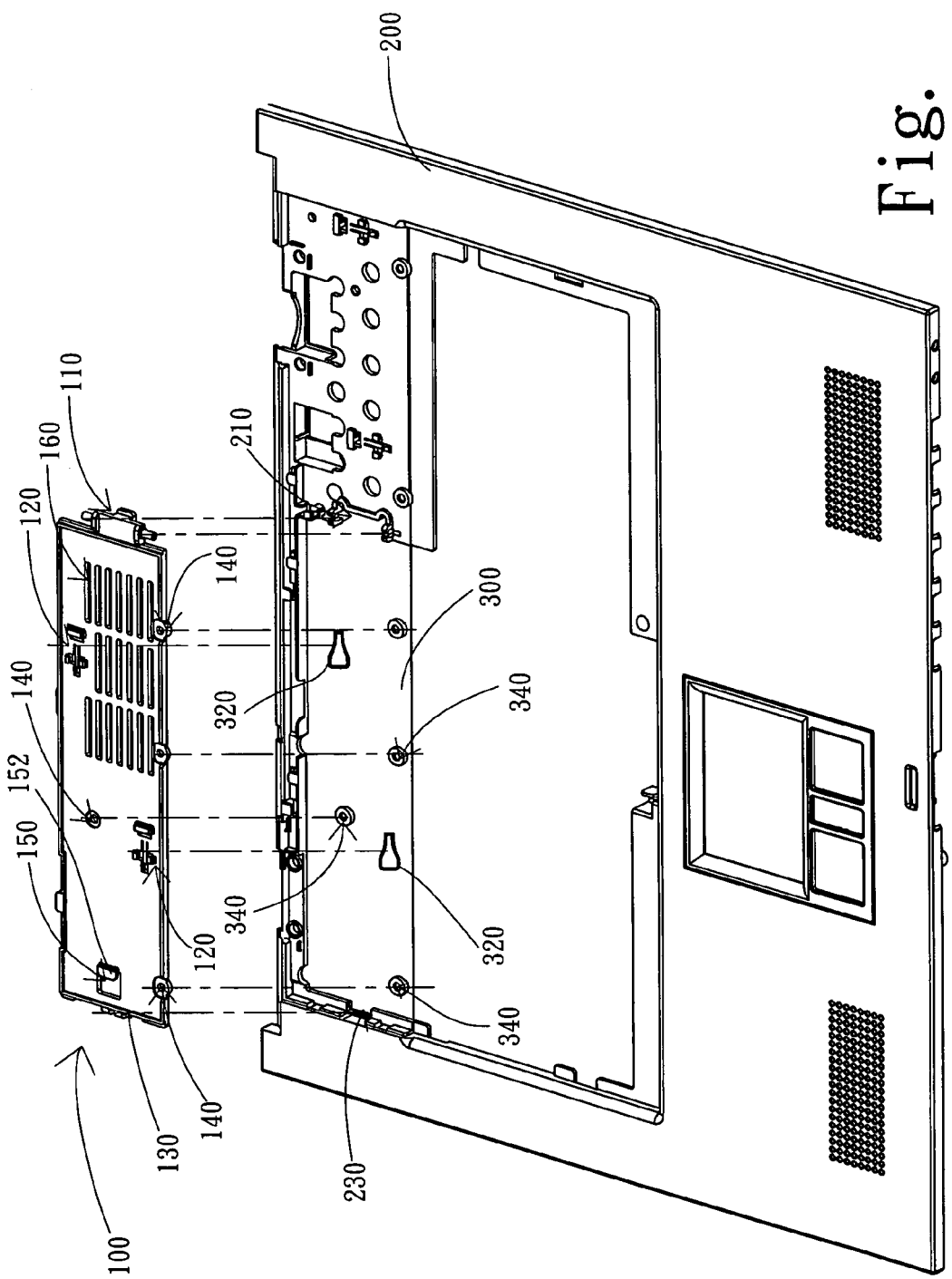
FIG. 1A is a schematic explosive view of detachable and rotatable door cover assembly, according to the present invention.
Figure 1B:
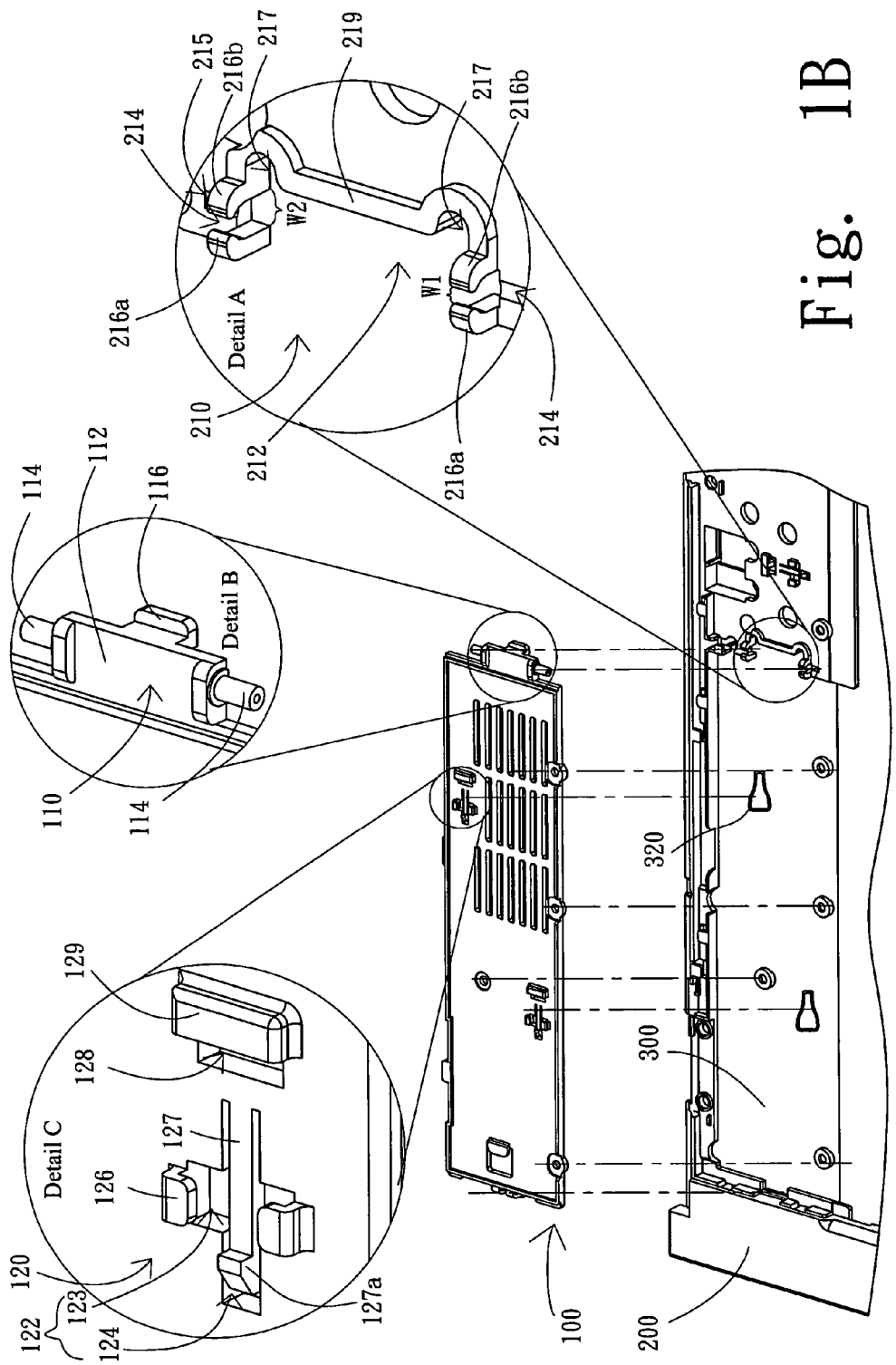
FIG. 1B is a schematic view showing several enlarged portions of the detachable and rotatable door cover assembly, according to the present invention.

Referring to FIG. 1A and FIG. 1B, FIG. 1A is a schematic explosive view of detachable and rotatable door cover assembly, according to the present invention; and FIG. 1B is a schematic view showing several enlarged portions of the detachable and rotatable door cover assembly, according to the present invention. The detachable and rotatable door cover assembly of the present invention comprises a rotation base 210 located on the housing of a notebook computer 200; a clipping groove 230 located on the housing of the notebook computer 200; and a door cover 100. The door cover 100 comprises a rotating member 110 located on one end of the door cover 100; a clipping groove 130 located on the end of the door cover 100 opposite to the rotating member 110. The clipping groove 130 is located on the other end of the door cover 100 opposite to the rotating member 110. The clipping groove 230 is located on the housing of the notebook computer 200 corresponding to the clipping groove 130. The rotating member 110 is located on the housing of the notebook computer 200 corresponding to the rotation base 210. Further, the detachable and rotatable door cover assembly of the present invention comprises at least one locking ring 320 installed on the thermal module 300; and at least one ring holder 120 located on the door cover 100. The door cover 100 can have a plurality of vents used for dissipating heat. Further, according to the present invention, the rotation base 210, the clipping hook 130, the clipping groove 230, the locking ring 320 and the ring holder 120 can be made of elastic material. Hereinafter, the assembly step and the description regarding each component of the present invention will be described in detail.

At first, the thermal module 300 is installed in the notebook computer 200, wherein fastening elements such as screws can be used to fix the thermal module 300 on the notebook computer 200 via fixing holes 340. Since the method for fixing the thermal module 300 is not the main point of the present invention, it will be stated herein.

Thereafter, the rotating member 110 located on one end of the door cover 100 is pivotally connected to the rotation base 210 located in the housing of the notebook computer 200 so that the door cover 100 rotates using the rotation base 210 as an axis. Such as shown in detail A of FIG. 1B, the rotation base 210 has an U-shaped opening 212 of which the opening direction faces towards the rotating member 110, and there are shaft holders 215 respectively located on both ends of the U-shaped opening 212, wherein each of the shaft holders 215 is composed of a pair of shaft blocks 216a and 216b which are separated and mutually mirror-reflected in shape. The bottoms of the shaft blocks 216a and 216b are connected to both ends of the U-shaped opening 212, and each of the shaft blocks 216a and 216b is higher than the U-shaped opening 212. The distance W1 between the top ends of the shaft blocks 216a and 216b is smaller than the distance W2 between the bottom ends of the shaft blocks 216a and 216b. There is an arc-surfaced depression area 214 located on the area immediately outside the shaft holders 215 of the U-shaped opening 212. Further, such as shown in detail B of FIG. 1B, the rotating member 110 at least has: a rotating main body 112, wherein one end of the rotating main body 112 is connected to one end of the door cover 110, and there are a pair of rotating shafts 114 respectively located on both ends the rotating main body 112, wherein each of the rotating shafts 114 can be arranged in the arc-surfaced depression area 214 after passing through the area between the top ends of the shaft blocks 216a and 216b.

Further, the rotating member 110 can have a L-shaped extending portion 116, and the L-shaped extending portion 116 is located under the sidewall of the rotating main body 112, wherein the open end of the L-shaped extending portion 116 faces outwards from the rotating main body 112 and can be inserted into the area below a side 219 of the U-shaped opening 212. The joint area between the side 219 and each end of the U-shaped opening 212 has a concaved area 217 near the shaft blocks 216b having a semi-cylindrical surface, thereby enabling the door cover 100 to be rotated conveniently.

Such as shown in detail C of FIG. 1B, the ring holder 120 is located on the door cover 100 corresponding to the locking ring 320. The ring holder 120 has a ring outlet 128; a cross-shaped hole 122. The cross-shaped hole 122 is formed by intercrossing a striped hole 124 and a striped hole 123, wherein the striped hole 124 is adjacent to and spaced apart from the ring outlet 128 with a distance. There is a ring fixing plate 127 located in the striped hole 124, wherein one end of the ring fixing plate 127 is connected to the sidewall of one end of the striped hole 124 adjacent to the ring outlet 128, and the other end of the ring fixing plate 127 has a protrusion 127a for engaging with the locking ring 320. There are a pair of L-shaped clipping blocks 126 respectively located on the areas outside both ends of the striped hole 123, and the open ends of the L-shaped clipping blocks 126 are corresponding to each other, wherein the locking ring 320 can be inserted into and exposed from the ring inlet 128, and be locked with the L-shaped clipping blocks 126 after being folded towards the protrusion 127a of the ring fixing plate 127. The ring holder 120 also has a ring block 129 located on one side of the ring outlet 128 opposite to the cross-shaped hole 122, thereby forcing the locking ring 320 to be bent towards the protrusion 127a.

Further, such as shown in FIG. 1A, the door cover 100 can have a recession area 150, and there is a covering plate 152 located above and covers a portion of the recession area 150, thereby conveniently opening the door cover 100. For reinforcing the fastening effect, the present invention can further install at least one fixing hole 340 on the thermal module 300; and at least one fixing through hole 140 on the door cover 100 corresponding to the fixing hole 340, so that the door cover 100 can be fixed on the thermal module 300 by inserting fastening elements (not shown) through the fixing through hole 140 and into the fixing hole 340.

Figure 2:
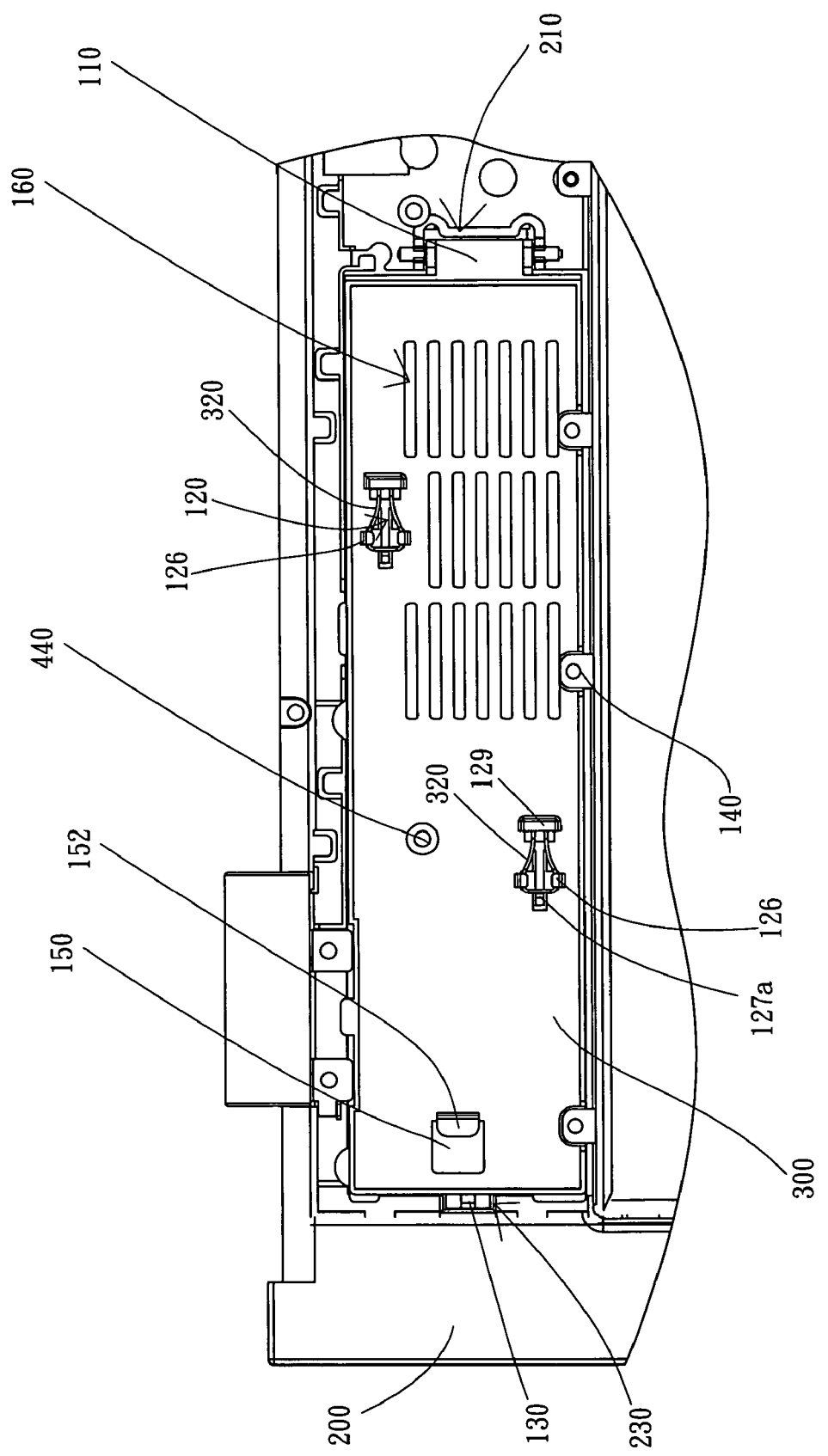
FIG. 2 is a schematic view showing the detachable and rotatable door cover assembly of the present invention after the assembling process is done.

Referring FIG. 2, FIG. 2 is a schematic view showing the detachable and rotatable door cover assembly of the present invention after the assembling process is done. After the present invention is assembled, the door cover, the thermal module and the notebook computer can be firmly combined together by the interference fit between the rotating member 110 and the rotation base 210; that between the locking ring 320 and the ring holder 120; that between the clipping hook 130 and the clipping groove 230.

Figure 3:
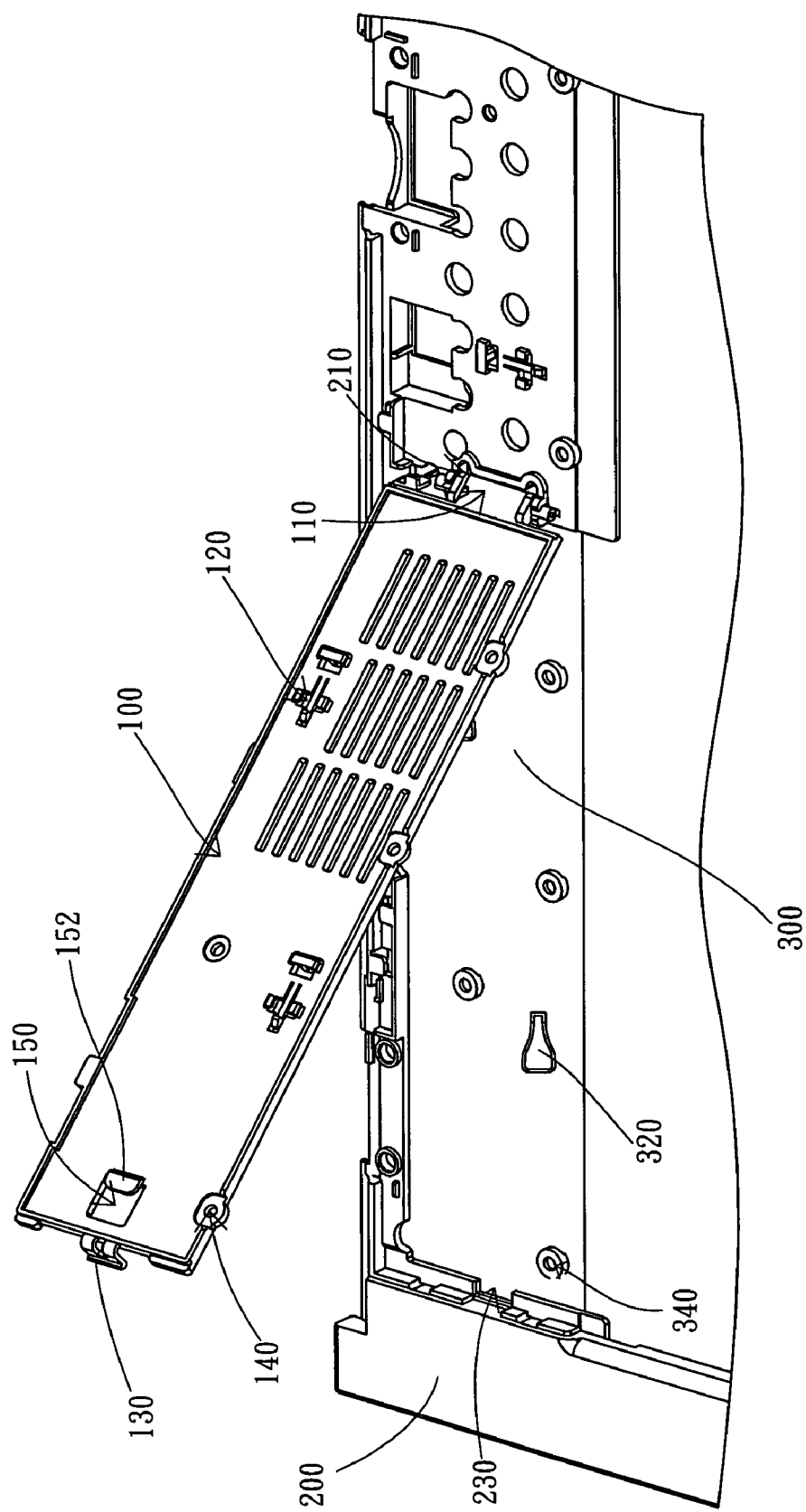
FIG. 3 is a schematic view showing the step of dismantling the detachable and rotatable door cover assembly of the present invention.

Referring to FIG. 3, FIG. 3 is a schematic view showing the step of dismantling the detachable and rotatable door cover assembly of the present invention. When the thermal module 300 is desired to be dismantled, users merely need to remove the locking ring 320 from the ring holder 120, and then to pull the covering plate 152 upwards so as to separate the clipping hook 130 and the clipping groove 230, so that the door cover 100 can be opened via the combination of the rotating member 110 and the rotation base 210. Hence, the present invention can be applied to overcome the shortcoming of the conventional skill with which the top case of the notebook computer's main unit has to be completely separated from the notebook computer's main unit for smoothly replacing a thermal module.

It can be known from the aforementioned preferred embodiment of the present invention, the advantages of applying the present invention are: greatly simplifying the steps of replacing the thermal module, thus saving a lot of manpower and material cost; and firmly combining the door cover, the thermal module and the notebook computer together by the method of interference fit. Therefore, the detachable and rotatable door cover assembly has highly industrial application value.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A detachable and rotatable door cover assembly, comprising:
    a machine body, having a module;
    a rotation base, located on said machine body;
    a clipping groove, located on said machine body;
    a door-cover main body, installed on said machine body in a detachable way;
    a rotating member, located on a first end of said door-cover main body, wherein said rotating member is pivotally connected to said rotation base, thereby rotating said door-cover main body;
    a clipping hook, located on a second end of said door-cover main body, wherein said clipping hook is suitable for use in engaging with said clipping groove; and
    least one locking ring, installed on the module; and
    at least one ring holder, suitable for use in engaging with said locking ring, said ring holder at least having:
        a ring outlet;
        a cross-shaped hole formed by intercrossing a first striped hole and a second striped hole, wherein said first striped hole is adjacent to and spaced apart from said ring outlet with a distance;
        a ring fixing plate, located in said first striped hole, wherein one end of said ring fixing plate is connected to the sidewall of one end of said first striped hole adjacent to said ring outlet, the other end of the ring fixing plate having a protrusion; and
        a pair of L-shaped clipping blocks, respectively located on the areas outside both ends of said second striped hole, wherein the open ends of said L-shaped clipping blocks are opposite to each other, and said locking ring can be inserted into and exposed from said ring inlet, and be locked with said L-shaped clipping blocks after being folded towards said protrusion of said ring fixing plate.

2. The detachable and rotatable door cover assembly of claim 1, wherein said rotation base at least includes:
    a U-shaped opening, wherein the opening direction of said U-shaped opening faces towards said rotating member; and
    a pair of shaft holders, respectively located on both ends of said U-shaped opening, wherein each of said shaft holders is composed of a pair of shaft blocks which are separated and mutually mirror-reflected in shape, and the bottoms of said shaft blocks are connected to each of said both ends of said U-shaped opening, and said shaft blocks are higher than said U-shaped opening, and there is an arc-surfaced depression area located on the area immediately outside said U-shaped opening.

3. The detachable and rotatable door cover assembly of claim 2, wherein said rotating member at least includes:
    a rotating main body, wherein one end of said rotating main body is connected to said first end of said door-cover main body; and
    a pair of rotating shafts, respectively located on two ends of said rotating member adjacent to said one end of said rotating main body, wherein each of said rotating shafts is arranged in said arc-surfaced depression area after passing through the area between the top ends of said shaft blocks.

4. The detachable and rotatable door cover assembly of claim 2, said rotating member at least includes:
    a L-shaped extending portion, located under said rotating main body, wherein the open end of said L-shaped extending portion faces outwards from said rotating main body and can be inserted into the area below said rotation base.

5. The detachable and rotatable door cover assembly of claim 2, wherein the distance between the top ends of said shaft blocks is smaller than the distance between the bottom ends of said shaft blocks.

6. The detachable and rotatable door cover assembly of claim 1, wherein said rotation base, said clipping hook, said clipping groove, said locking ring and said ring holder are made of elastic material.

7. The detachable and rotatable door cover assembly of claim 1, wherein said ring holder further at least includes:
    a ring block, located on one side of said ring outlet opposite to said cross-shaped hole, used for forcing said locking ring to be bent towards said protrusion of said ring fixing plate.

8. The detachable and rotatable door cover assembly of claim 1, further comprising:
    said module having at least one fixing hole;
    said door-cover main body having at least one fixing through hole; and
    at least one fastening element, suitable for use in penetrating through said fixing through hole and into said fixing hole, so as to fix said door-cover main body on said module.

9. The detachable and rotatable door cover assembly of claim 1, wherein said door-cover main body includes:
    a recession area, and there is a covering plate located above a portion of said recession area, used for conveniently opening said door-cover main body.

10. The detachable and rotatable door cover assembly of claim 1, wherein said machine body belongs to a notebook computer.

11. The detachable and rotatable door cover assembly of claim 1, wherein said module is a thermal module.

12. A detachable and rotatable door cover assembly, used for covering a thermal module located in a notebook computer, said detachable and rotatable door cover assembly comprising:
    a rotation base, located on said notebook computer, wherein said rotation base at least includes:
        a U-shaped opening, wherein the opening direction of said U-shaped opening faces towards said rotating member; and
        a pair of shaft holders, respectively located on both ends of said U-shaped opening, wherein each of said shaft holders is composed of a pair of shaft blocks which are separated and mutually mirror-reflected in shape, and the bottoms of said shaft blocks are connected to each of said both ends of said U-shaped opening, and said shaft blocks are higher than said U-shaped opening, and there is an arc-surfaced depression area located on the area immediately outside said U-shaped opening;

a clipping groove, located on said notebook computer;

at least one locking ring, installed on said thermal module; and a door cover, comprising:

a rotating member, located on a first end of said door cover, wherein said rotating member is pivotally connected to said rotation base, thereby rotating said door cover, said rotating member at least having:

a rotating main body, wherein one end of said rotating main body is connected to said first end of said door cover; and a pair of rotating shafts, respectively located on two ends of said rotating member adjacent to said one end of said rotating main body, wherein each of said rotating shafts is arranged in said arc-surfaced depression area after passing through the area between the top ends of said shaft blocks;

a clipping hook, located on a second end of said door cover, wherein said clipping hook is suitable for use in engaging with said clipping groove; and at least one ring holder, suitable for use in engaging with said locking ring, said ring holder at least having:

a ring outlet;

a cross-shaped hole formed by intercrossing a first striped hole and a second striped hole, wherein said first striped hole is adjacent to and spaced apart from said ring outlet with a distance;

a ring fixing plate, located in said first striped hole, wherein one end of said ring fixing plate is connected to the sidewall of one end of said first striped hole adjacent to said ring outlet, the other end of the ring fixing plate having a protrusion; and a pair of L-shaped clipping blocks, respectively located on the areas outside both ends of said second striped hole, wherein the open ends of said L-shaped clipping blocks are opposite to each other, and said locking ring can be inserted into and exposed from said ring inlet, and be locked with said L-shaped clipping blocks after being folded towards said protrusion of said ring fixing plate.

13. The detachable and rotatable door cover assembly of claim 12, said rotating member at least includes:

an L-shaped extending portion, located under the other end of said rotating main body, wherein the open end of said L-shaped extending portion faces outwards from said rotating main body and can be inserted into the area below said rotation base.

14. The detachable and rotatable door cover assembly of claim 12, wherein the distance between the top ends of said shaft blocks is smaller than the distance between the bottom ends of said shaft blocks.

15. The detachable and rotatable door cover assembly of claim 12, wherein said rotation base, said clipping hook, said clipping groove, said locking ring and said ring holder are made of elastic material.

16. The detachable and rotatable door cover assembly of claim 12, wherein said ring holder further at least includes:

a ring block, located on one side of said ring outlet opposite to said cross-shaped hole, used for forcing said locking ring to be bent towards said protrusion of said ring fixing plate.

17. The detachable and rotatable door cover assembly of claim 12, further comprising:

said thermal module having at least one fixing hole;

said door cover having at least one fixing through hole; and at least one fastening element, suitable for use in penetrating through said fixing through hole and into said fixing hole, so as to fix said door cover on said thermal module.

18. The detachable and rotatable door cover assembly of claim 12, wherein said door cover includes:

a recession area, and there is a covering plate located above a portion of said recession area, used for conveniently opening said door cover.

* * * * *